United States Patent
Barnette et al.

(10) Patent No.: US 7,938,884 B2
(45) Date of Patent: May 10, 2011

(54) INTEGRAL SWEEP CONTROLLER FOR GAS MEMBRANE SEPARATION DEVICE

(75) Inventors: Darrin Barnette, Bridgeville, PA (US); Timothy Fox, Waynesburg, PA (US); Mark Honath, McKees Rocks, PA (US); Craig Cuta, Stillwater, MN (US); Carl Geisz, St. Paul, MN (US); John Burban, Lake Elmo, MN (US)

(73) Assignee: SPX Corporation, Charlotte, NC (US)

( * ) Notice: Subject to any disclaimer, the term of this patent is extended or adjusted under 35 U.S.C. 154(b) by 523 days.

(21) Appl. No.: 12/022,433

(22) Filed: Jan. 30, 2008

(65) Prior Publication Data

US 2008/0178735 A1    Jul. 31, 2008

Related U.S. Application Data

(60) Provisional application No. 60/898,406, filed on Jan. 31, 2007.

(51) Int. Cl.
*B01D 53/22* (2006.01)

(52) U.S. Cl. .................. 95/45; 95/1; 95/52; 96/4; 96/8; 96/10; 96/417; 210/640; 55/DIG. 17

(58) Field of Classification Search .................. 96/4, 8, 96/10, 417, 421, 422; 95/1, 10, 19, 23, 45, 95/52; 210/640; 34/79; 55/DIG. 17
See application file for complete search history.

(56) References Cited

U.S. PATENT DOCUMENTS

| | | | |
|---|---|---|---|
| 3,607,133 A | 9/1971 | Hirao et al. | |
| 4,054,428 A | 10/1977 | Foltz | |
| 4,865,815 A | 9/1989 | Martin et al. | |
| 5,160,514 A * | 11/1992 | Newbold et al. | 96/8 |
| 5,330,723 A | 7/1994 | Martin et al. | |
| 5,605,564 A * | 2/1997 | Collins | 95/52 |
| 5,906,675 A | 5/1999 | Jain et al. | |
| 6,070,339 A | 6/2000 | Cunkelman | |
| 6,126,724 A | 10/2000 | Martin et al. | |
| 6,128,825 A * | 10/2000 | Cunkelman | 95/52 |
| 6,296,683 B1 | 10/2001 | Koch | |
| 6,616,735 B1 * | 9/2003 | Burban et al. | 96/8 |
| 6,719,825 B2 * | 4/2004 | Wedge et al. | 95/52 |
| 6,740,140 B2 * | 5/2004 | Giglia et al. | 95/52 |
| 6,755,894 B2 | 6/2004 | Bikson et al. | |
| 6,776,820 B2 * | 8/2004 | Bikson et al. | 95/52 |
| 6,814,780 B2 | 11/2004 | Bikson et al. | |
| 7,153,341 B2 * | 12/2006 | Hoyt et al. | 95/52 |
| 7,517,388 B2 * | 4/2009 | Jensvold | 95/45 |
| 7,678,177 B2 * | 3/2010 | Nichols | 95/52 |
| 2003/0143129 A1 | 7/2003 | Rabellino et al. | |

FOREIGN PATENT DOCUMENTS

EP  0512474 B1  7/1997

(Continued)

*Primary Examiner* — Jason M Greene
(74) *Attorney, Agent, or Firm* — Baker & Hostetler LLP (57) ABSTRACT

A method and apparatus are provided for controlling the amount of purging that occurs within a membrane separation device. The membrane separation device includes a membrane separation component and sweep controlling component. Within the membrane separation component, a major portion of the non-permeate gas is sent out of the membrane separation device to work, while a minor portion is diverted for use as a sweep gas. The sweep gas is controlled by a valve that cycles with a device, such as a compressor. Thus, the membrane separation device is on when the compressor is on and is off when the compressor is off. As such, the membrane separation device is not required to sweep at all times.

22 Claims, 7 Drawing Sheets

FOREIGN PATENT DOCUMENTS

| | | |
|---|---|---|
| EP | 0832021 B1 | 4/1998 |
| EP | 0903173 B1 | 3/1999 |
| EP | 0973599 B1 | 1/2000 |
| EP | 1108458 A1 | 6/2001 |
| EP | 1374974 A2 | 1/2004 |
| EP | 1318936 B1 | 6/2006 |
| WO | WO 01/34280 A1 | 5/2001 |
| WO | WO 2004/079049 A1 | 9/2004 |

* cited by examiner

FIG. 1

DETAIL A

INTEGRAL SWEEP CONTROLLER FOR GAS MEMBRANE SEPARATION DEVICE

CROSS-REFERENCE TO RELATED APPLICATIONS

This application claims priority to U.S. Provisional Application Ser. No. 60/898,406, filed Jan. 31, 2007, entitled "INTEGRAL SWEEP CONTROLLER FOR GAS MEMBRANE SEPARATION DEVICE," the entire contents of which are incorporated herein by reference.

FIELD OF THE INVENTION

This invention relates generally to an integral sweep controller for a gas membrane separation device. More particularly, the present invention relates, for example, to an integral sweep controller for treating compressed air with a membrane dryer.

BACKGROUND OF THE INVENTION

It is known in the art that compressed air, which has several uses including in food packaging, pharmaceutical labs and integrated circuit manufacturing, may be treated to remove contaminants and water vapor. Compressed air is treated before use in manufacturing systems to remove water vapor and contaminants from the air that may spoil the end product or at least increase the cost of production by robbing the system of power and efficiency. As untreated compressed air is moved through a system, the temperatures may drop, which in turn may cause the water vapor to condense. The introduction of water may cause rust or leakage of the air lines. With conventional compressed air treatment equipment, system power may be preserved, operating expenses may be reduced, and production quality may be improved by removing water vapor from compressed air.

It is known in the art that cleaning compressed air using a membrane dryer removes contaminants and water vapor and also, reduces its dew point, which is the temperature at which the air must be cooled, at constant barometric pressure, for the water vapor component to condense into water. Compressed air may be moved through a bundle of hollow fibers, which may be composed of a membrane specifically designed to attract water vapor. Thus, as compressed air passes through the membrane, the water vapor is absorbed on the inside of the fibers and passes quickly to the outer layers of the membrane. The dryer is driven by the water vapor partial pressure differential between the inside and outside of the hollow membrane fibers. To desorb the water vapor from the membrane fibers, conventional membrane dryers use a portion of the dried compressed air to flush the water vapor from the outer/permeate side of the hollow fibers and thus, continuously sweep the membrane of water vapor.

Similarly, separation of other gas mixtures may be accomplished by passing the gas mixture through a hollow fiber membrane, therein under a partial pressure differential, as long as there is one or more highly permeable components and other less permeable components. The membrane may then be purged by sweeping the system using the stream that has been stripped of the highly permeable component.

In conventional hollow fiber membrane gas separation devices, continuous purge or sweep may be used to increase the pressure differential that drives the system, improve the dryness of the product air and enhance productivity of the membrane. However, the continuous sweep of the membrane can be very expensive. Compressed air is an expensive medium and continual purging of membrane dryers wastes resources. Pressure cycling, either by closing the sweep outlet and allowing the outer side of the membrane fibers to pressurize, or by closing the dryer outlet and allowing the inner side of the membrane fibers to de-pressurize, is sometimes used in conventional membrane dryers as a means of controlling or stopping the sweep flow. Furthermore, pressure cycling stresses the membrane fibers and can lead to fiber failure, creating a direct path from the non-permeate portion of the bundle to the permeate side, thereby, requiring replacement of the costly membrane bundle. In the present invention, the sweep flow is controlled at its source, preventing pressure cycling and its damaging effects on the membrane fibers.

Most conventional membrane dryers continuously sweep at a constant rate. Attempts have been made to decrease the amount of gas used to sweep the membrane but these previous systems still sweep at least some amount of product gas at all times. Accordingly, it is desired to dry compressed air in a system that selectively sweeps the membrane only when product is drawn from the dry air outlet and to do so without pressure cycling the membrane fibers. Another desire is to provide a sweep gas arrangement that is integral to the membrane dryer to reduce space requirements.

SUMMARY OF THE INVENTION

The foregoing needs are met, to a great extent, by the present invention, wherein aspects of an integral sweep control feature may be added to conventional membrane dryers to allow selective sweep of the membrane. Example embodiments of the present invention provide an integral sweep controller in a compact sweep gas arrangement.

In accordance with an embodiment of the present invention, a membrane separation device may have an integral sweep controlling apparatus, comprising: a membrane separation component, including: a membrane having a permeate portion and a non-permeate portion; a membrane housing which encases the membrane; a feed gas inlet conduit connected to the membrane; and, a non-permeate product gas outlet conduit fluidly connected to the non-permeate portion of the membrane, wherein a major portion of a non-permeate gas is directed out of the membrane separation device through the non-permeate product gas outlet conduit.

The membrane separation device may also have sweep controlling components coupled to the membrane separation component, comprising: a sweep inlet conduit providing a gas connection from the sweep controlling components to the non-permeate portion of the membrane; a valve having multiple positions and connected to said sweep inlet conduit, wherein: the multiple positions of the valve control passage of a minor portion of the non-permeate gas into an orifice, wherein the minor portion of the non-permeate gas is diverted from the major portion within the membrane housing; and, said orifice controls a sweep stream that passes the minor portion of the non-permeate gas along the permeate portion of the membrane; a sweep outlet conduit connected to the membrane housing, and carries the sweep stream out of the sweep controlling components; and a sweep manifold attached to the membrane housing, wherein the valve is attached to the sweep manifold. In example embodiments, the valve may be an on-off valve, such as a solenoid valve. In example embodiments, the sweep inlet conduit may include a sweep fitting within the membrane housing. In example embodiments of the invention, seals are fitted between the sweep controlling components.

In some embodiments of the invention, the membrane separation device may have a membrane including a bundle of hollow fibers. In this embodiment, the non-permeate portion of the membrane includes a center portion of the bundle of hollow fibers that the non-permeate gas flows through to reach the non-permeate product gas outlet. A transfer tube may be in a center portion of the membrane for transferring the major portion of the non-permeate product gas from the non-permeate portion of the membrane to the non-permeate product gas outlet conduit.

In alternate embodiments, the invention may include a membrane fitting connected at the non-permeate portion of the membrane for passing the minor portion of the non-permeate gas through the sweep manifold. In example embodiments, the valve of the membrane separation device may be a solenoid valve. The valve may have voltage of 12 VAC to 480 VAC or alternatively, between 6 VDC and 125 VDC. The invention may also include a top bundle cap for sealing the sweep stream within the membrane housing and/or a bottom bundle cap for sealing the sweep stream within the membrane housing.

In example embodiments, the valve has an electronic control, such as a digital control, linked to an external device and cycles the valve open and closed with the operation of the external device. In some embodiments, the external device is an air compressor such that the electronic control enables the valve to vary with a duty cycle of the air compressor. Additionally, a recessed hex plug may be threaded into the sweep manifold. The membrane separation device may be mounted using a mounting bracket.

In example embodiments of the invention, a membrane separation device may include a sweep controlling apparatus, comprising: a membrane separation means comprising: separation means for separating permeate portions from non-permeate portions; encasement means for encasing said separation means; a feed inlet means for carrying a feed gas into the device; and, a non-permeate product gas outlet means for carrying a major portion of a non-permeate product gas out of the device.

The membrane separation device may also include a sweep controller means comprising: sweep inlet means for carrying a sweep gas into the sweep controller means, wherein the sweep gas includes a minor portion of the non-permeate gas which has been diverted from the major portion of the non-permeate gas within the encasement means. In example embodiments of the invention, the membrane separation device also includes orifice means for controlling passage of the sweep gas into the membrane separation means and along permeate portions of the separation means. The membrane separation device may also have valve means for controlling passage of a sweep gas from the sweep inlet means into the orifice means, wherein the valve means has multiple positions and sweep outlet means for carrying the sweep gas out of the sweep controlling apparatus wherein the sweep outlet means is connected to the encasement means and, sweep manifold means for passing the sweep gas into the valve means.

In example embodiments, a method for retrofitting sweep controlling components to a membrane separation vessel may include: removing a bundle of hollow fibers from a membrane separation bowl of the membrane separation vessel; removing a recessed hex plug from a center fitting of the membrane separation vessel; removing a flow orifice from the bundle of hollow fibers; replacing the flow orifice with the recessed hex plug; reinstalling the center fitting into the membrane separation vessel; reinstalling the bundle of hollow fibers into the membrane separation vessel; placing the flow orifice into a sweep control fitting; threading the sweep control fitting onto the membrane separation vessel; installing a sweep control manifold onto the membrane separation vessel, wherein the sweep control manifold attaches and aligns to the center fitting; and, installing a valve onto the sweep control manifold.

In example embodiments, a method of using a membrane separation device having an integral sweep controlling apparatus may include: separating a permeate gas from a non-permeate gas using a membrane separation component, comprising: flowing a feed gas into a feed gas inlet conduit connected to the membrane separation component; flowing the feed gas into a membrane having a permeate portion and a non-permeate portion, wherein the membrane is encased in a membrane housing; flowing the non-permeate gas into a product outlet conduit fluidly connected to the non-permeate portion of the membrane, wherein a major portion of the non-permeate gas is directed out of the membrane separation device through the product outlet conduit.

In example embodiments, the method may also include: flowing a minor portion of the non-permeate gas into sweep controlling components coupled to the membrane separation component, comprising: flowing the minor portion of the non-permeate gas through a sweep manifold attached to the membrane housing; flowing the minor portion of the non-permeate gas into a sweep inlet conduit providing a fluid connection from the sweep controlling components to the non-permeate portion of the membrane; and flowing the minor portion of the non-permeate gas into a valve having multiple positions and connected to the sweep inlet conduit and to the sweep manifold, wherein: the multiple positions of the valve control passage of the minor portion of the non-permeate gas into an orifice, wherein the minor portion of the non-permeate gas is diverted from the major portion within the membrane housing; and, the orifice controls a sweep stream that passes the minor portion of the non-permeate gas along the permeate portion of the membrane; and carrying the sweep stream out of the sweep controlling components using a sweep outlet conduit connected to the membrane housing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claim appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Various embodiments of the present invention provide for a membrane gas separation device with integral sweep controller components. In some arrangements, the present invention may be utilized as an integral sweep control for a compressed air membrane dryer, for example. It should be understood, however, that the present invention is not limited in its application to compressed air membrane dryer systems, but, for example, with other gas separation systems that utilize a product gas sweep. Embodiments of the invention will now be further described with reference to the drawing figures, in which like reference numbers refer to like parts throughout.

Figure 1:
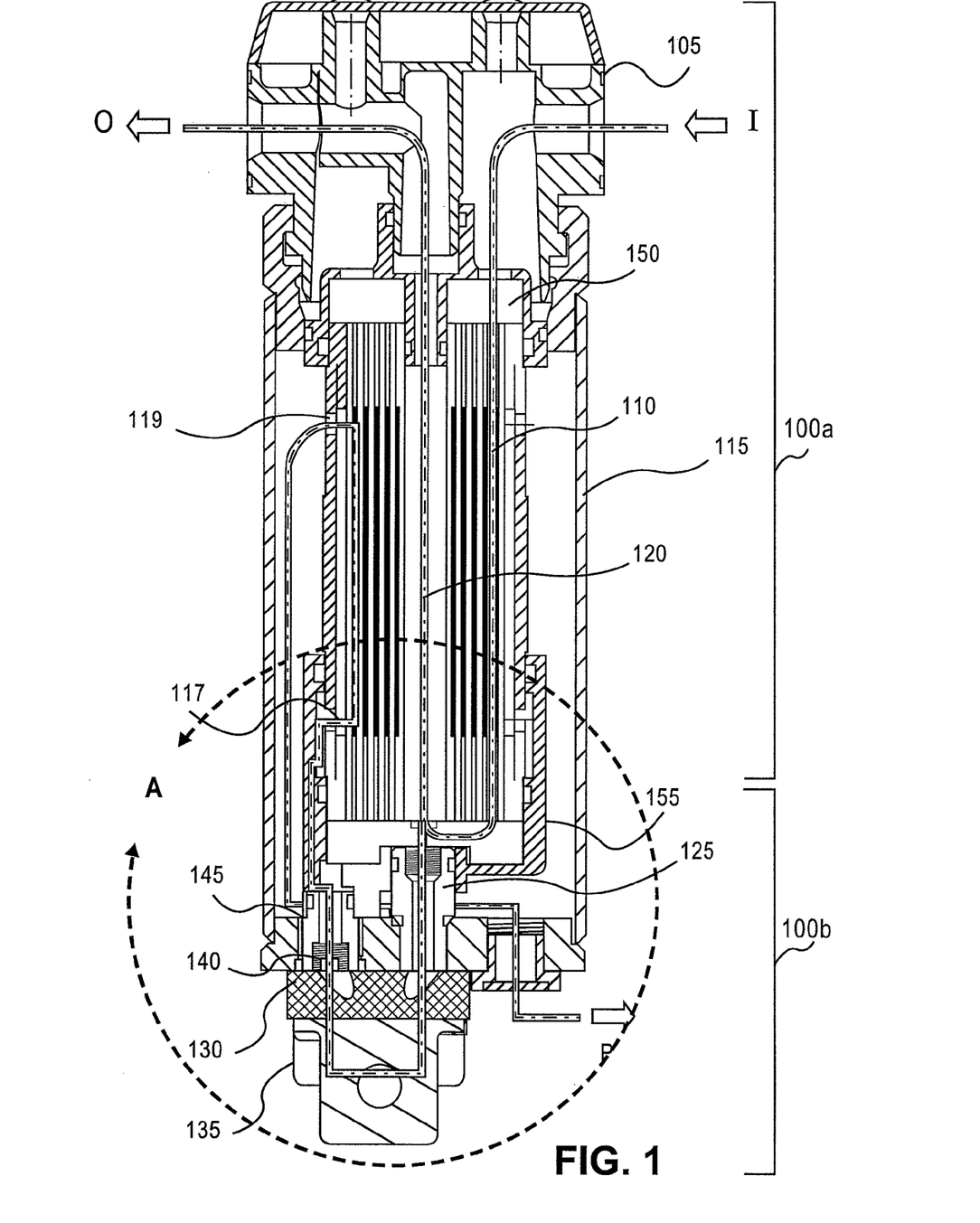
FIG. 1 is a sectional view of a membrane dryer with an integral sweep controller, according to an embodiment of the present invention.

FIG. 1 is a sectional view of a membrane dryer with an integral sweep controller, according to an embodiment of the present invention. In example embodiments of the present invention, a membrane dryer 100a having an integral sweep controller 100b is provided, as shown in FIG. 1. Example embodiments include a sweep manifold 130, a sweep control orifice 140 for metering the appropriate amount of sweep air, a sweep port fitting 145, and a valve 135 for control of the sweep air. The valve 135 may be an on-off valve, such as a solenoid valve.

In example embodiments of the present invention, compressed air containing water vapor enters a membrane head 105 of the dryer 100a through the wet air inlet I. The compressed air passes through a membrane dryer bundle 110, which is housed within a membrane dryer bowl or shell 115. The membrane dryer bundle 110, which may be wound helically or as other shapes, is specifically designed to attract water vapor and in one embodiment of the present invention, may be comprised of a bundle of hollow fibers. A water vapor partial pressure differential is present between the inside of the membrane dryer hollow fibers 110 and the outside of the membrane dryer hollow fibers 110, so that water vapor will migrate to the outside of the hollow fibers 110. Thus, as the compressed air passes through the inside of the membrane fibers, the water vapor is absorbed on the inside of the fiber wall and passes quickly through the walls of the fiber to the outer portion of the membrane fibers 110. In order to continuously filter and dry, the outer layers of the membrane fibers 110 must be purged of water vapors, as further discussed below.

The bulk of the dry air travels through a transfer tube 120 and leaves the dryer 100a through a dry air outlet O. The product dry air is then used to perform work or otherwise used in industrial processing and manufacturing. A smaller portion of the product dry air is diverted through a membrane bundle center fitting 125, which also acts to center the membrane bundle 110 within its housing 115. The membrane bundle center fitting 125 is designed to align with a bottom bundle cap 155. The sweep air is then swept through the sweep manifold 130 and into the sweep valve 135. In example embodiments of the present invention, the sweep manifold 130 mounts to the bottom of the membrane bowl 115 to enable the connection of the dryer 100a to the sweep controller components 100b, which may be best viewed in FIG. 2.

Figure 2:
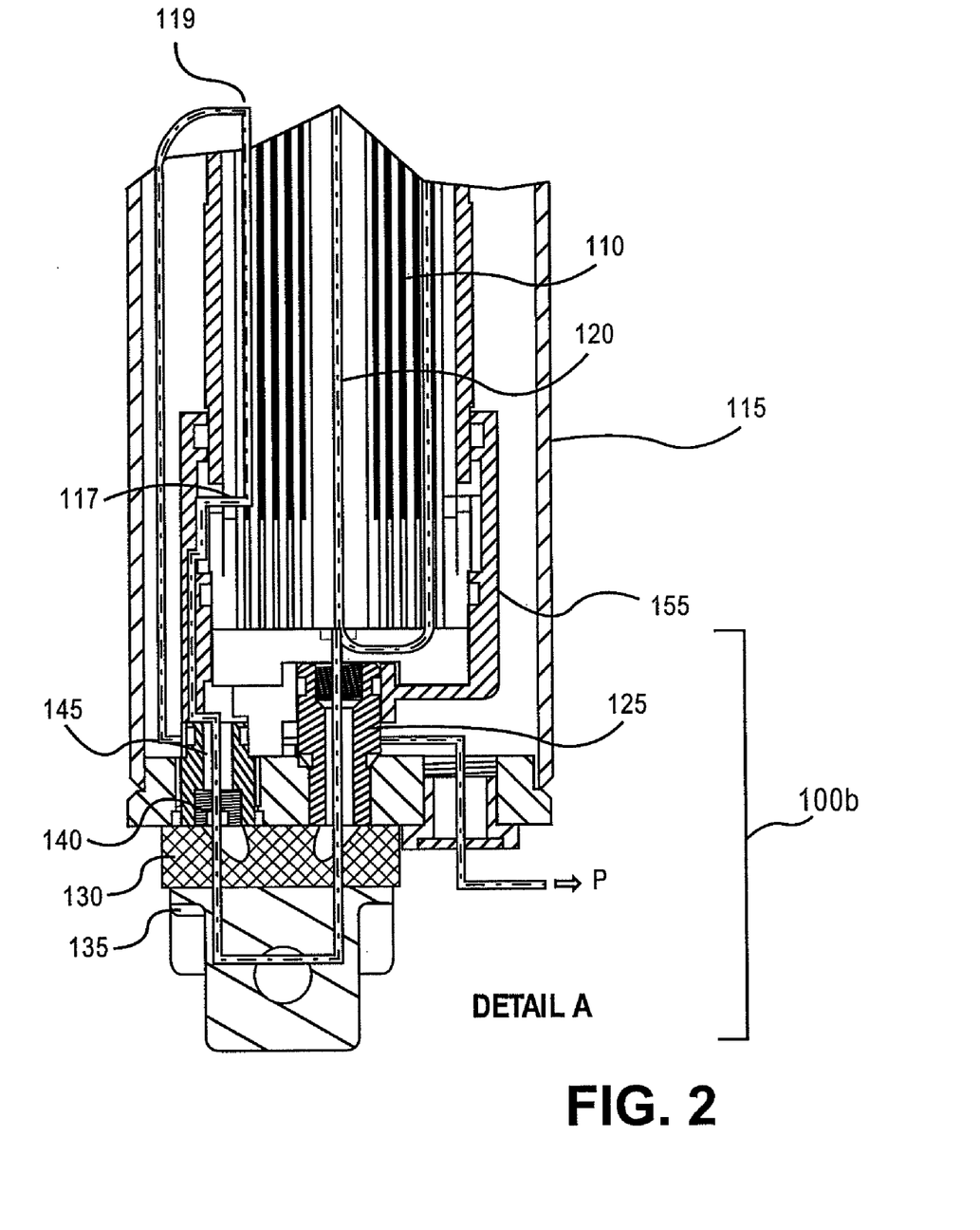
FIG. 2 provides a detailed sectional view of the integral sweep controller of the membrane dryer of FIG. 1.

FIG. 2 provides a detailed sectional view of the integral sweep controller of the membrane dryer of FIG. 1. The sweep air may be controlled by the sweep valve 135, which can electronically, for example digitally, cycle the sweep on and off based on air demand. If the valve 135 is closed, dry air will not sweep the membrane 110 and thus, reduce the amount of air lost to the environment. In other embodiments of the invention, the valve 135 may include an on-off valve having multiple positions rather than having merely a single open position and a closed position. For example, one such valve 135 may be a proportional solenoid valve having various open positions. As such, the sweep valve 135 may be controlled such that it varies with the duty cycle of the air compressor of the system (not shown). Because air is not lost through continuous purging, the overall run time of the compressor may be reduced.

Pressure cycling, which is sometimes used in conventional membrane dryers to control sweep flow, stresses the membrane fibers. Stressed membrane fibers are more prone to failure, which causes more dry air product to be lost due to an increased flow of air from the high-pressured inside of the membrane fibers into the sweep. Controlled purging, in example embodiments of the present invention, eliminates pressure cycling and protects the membrane fibers against premature failure.

When the valve 135 is open, the sweep path continues back up through the sweep manifold (also called the sweep control manifold) 130 and into the sweep orifice (also called the bundle flow orifice) 140, and then up the sweep control fitting 145, to travel through the inner portion of the membrane dryer bowl 115 to sweep water vapor from the exterior/permeate side of the hollow membrane tubes of the bundle 110. The sweep air can enter through a lower cavity 117 at a lower portion of the bowl 115. Once the sweep air travels up the fiber bundle 110, it can exit through an upper cavity 119 at an upper portion of the bowl 115.

Top bundle cap 150 and bottom bundle cap 155 seal the sweep gas in the membrane dryer bowl 115. The top bundle cap 150 may be located near the point at which the wet air inlet I meets the membrane bundle 110. In example embodiments of the present invention, the bottom bundle cap 155 may be located directly above the membrane bundle center fitting 125. Sweep exhaust, consisting of rewetted air, exits the device through sweep outlet P. Because the valve 135 is open, the rate at which sweep exhaust exits the sweep outlet P is controlled by the diameter size of the sweep orifice 140, which meters out sweep air. The diameter size of the sweep orifice 140 can vary depending on the need of the user. Alternatively, the valve 135 may be replaced by a valve that varies the size of its opening so that it can assist in the metering of sweep gas. Thus, the valve 135 provides an electronic control of the sweep with a feed back loop. In example embodiments of the present invention, the valve 135 may include voltage options from 12 volts of alternating current (VAC) to 480 VAC. In other embodiments of the invention, the voltage may be 6 volts of direct/continuous current (VDC) to 125 VDC.

The present invention may serve as an energy-saving device due to the sweep controller components, which allow treatment of compressed air in a system that selectively sweeps the membrane bundle 110 only when product is drawn from the dry air outlet O. Energy savings are highest when air demand is smallest. The present invention also provides a sweep gas arrangement that is integral to the membrane dryer 100*a*. The sweep controller components may be integrally mounted to the membrane dryer housing 115 in a compact design, thereby reducing space requirements.

Figure 3:
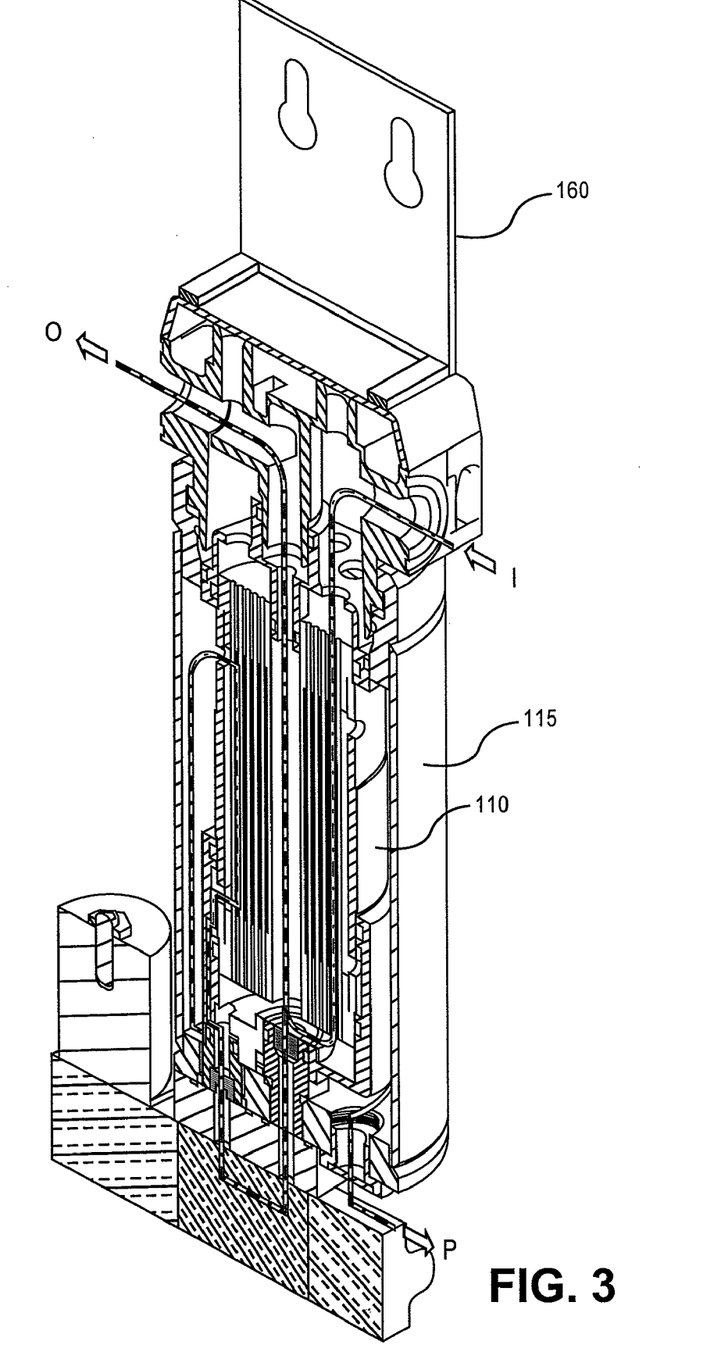
FIG. 3 provides an angled sectional view of the membrane dryer of FIG. 1.

In example embodiments of the present invention, the sweep controller components 100*b* may be ported internally and requiring no external piping that would require additional space, as shown in the angled view of FIG. 3. FIG. 3 provides an angled sectional view of the membrane dryer of FIG. 1. In example embodiments of the present invention, a membrane dryer mounting bracket 160 may be used to install the membrane dryer 100*a* with integral sweep controller 100*b*.

Because the valve 135 of the sweep controller may be tied directly to a compressor (not shown), the sweep controller may cycle on and off based on the compressor duty cycle. In the off portion of the cycle, dry compressed air is not lost to the surroundings and the compressor run time is reduced. Accordingly, sweep flow may be aligned with air demand to allow precise dew point control without waste. The present invention additionally reduces costly, premature replacement of membrane dryer bundle 110 due to pressure cycling and subsequent fiber failure.

Figure 4A:
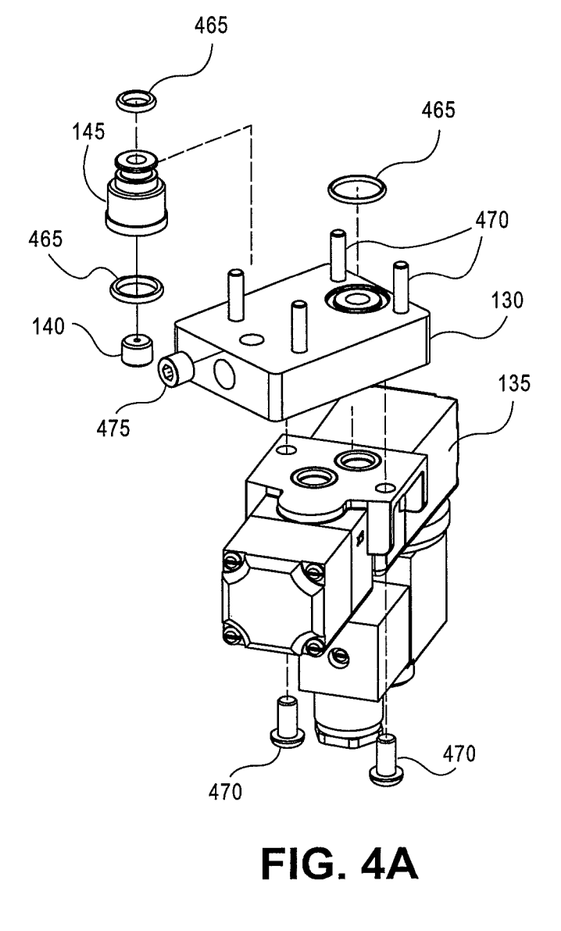
FIG. 4A provides an exploded view of the integral sweep controller of FIG. 1 and its components and FIG. 4B provides a plan view of the integral sweep controller of FIG. 1.
Figure 4B:
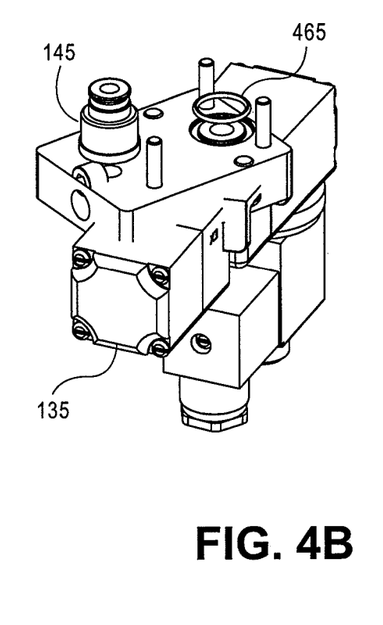

FIG. 4A provides an exploded view of the integral sweep controller of FIG. 1 and its components. FIG. 4B provides the assembled integral sweep controller. Example embodiments may also include o-rings 465 of various sizes that fit to the sweep control fitting 145 and sweep control manifold 130. In retrofitting a conventional dryer (not shown in FIG. 4A or 4B), a hole is left when the flow orifice 140 is displaced from its position in an existing dryer to its position within the integral sweep controller 100*b*, as discussed further below. Socket head cap screws 470 may be used to attach the sweep control manifold 130 to the valve 135, as shown in FIG. 4A. Example embodiments may also include recessed hex plug 475 that may be threaded into the sweep control manifold 130. The purpose of the recessed hex plug 475 would be to close the cross drilled hole in the manifold 130 of certain embodiments.

Figure 5:
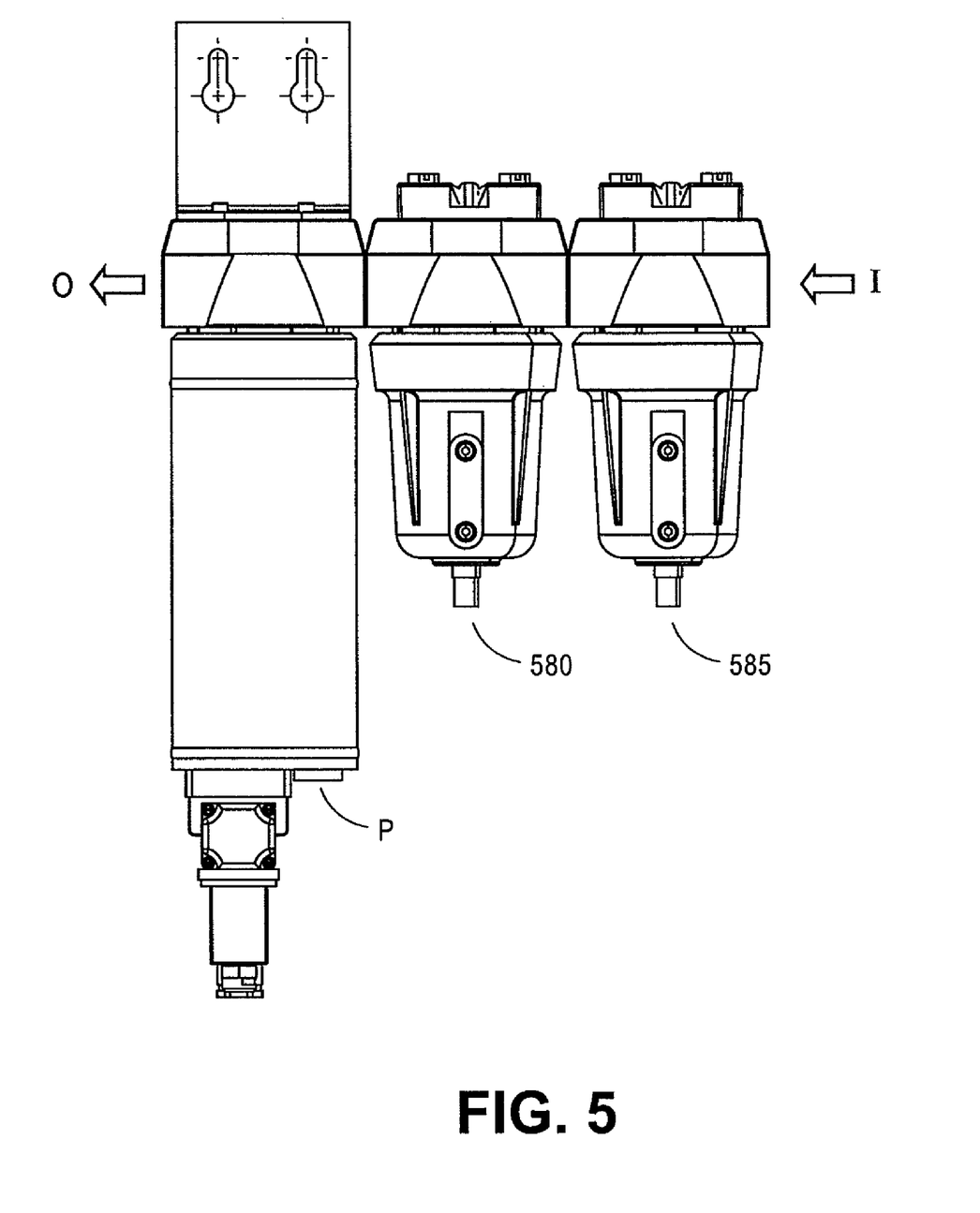
FIG. 5 provides a frontal view of the membrane dryer of FIG. 1 having single and dual pre-filters.

In example embodiments of the present invention, the membrane dryer 100*a* having an integral sweep controller 100*b* may be used in conjunction with conventional pre-filters which treat the air before it is treated in the membrane dryer bundle 110, as shown in FIG. 5. FIG. 5 provides a frontal view of the membrane dryer of FIG. 1 having single and dual pre-filters. In the case of a single pre-filter arrangement, a first pre-filter 580 may be attached to the membrane head 105 via conventional means. In the case of a dual pre-filter arrangement, a second pre-filter 585 is attached to the first pre-filter 580. The pretreated air would then enter the wet air inlet I and would enter the second pre-filter 585. Upon exiting the second pre-filter 585, the pretreated air would enter the first pre-filter 580. Upon exiting the first pre-filter 580, the dually pretreated air would enter the membrane dryer 100*a* having an integral sweep controller 100*b* and exits the system as dry air output O. The integral sweep controller 100*b* outputs the sweep exhaust, only as required. In example embodiments, the dual pre-treatment components 580, 585 and the membrane dryer 100*a* with integral sweep controller 100*b* may be mounted to a structure using a mounting bracket 160.

Figure 6:
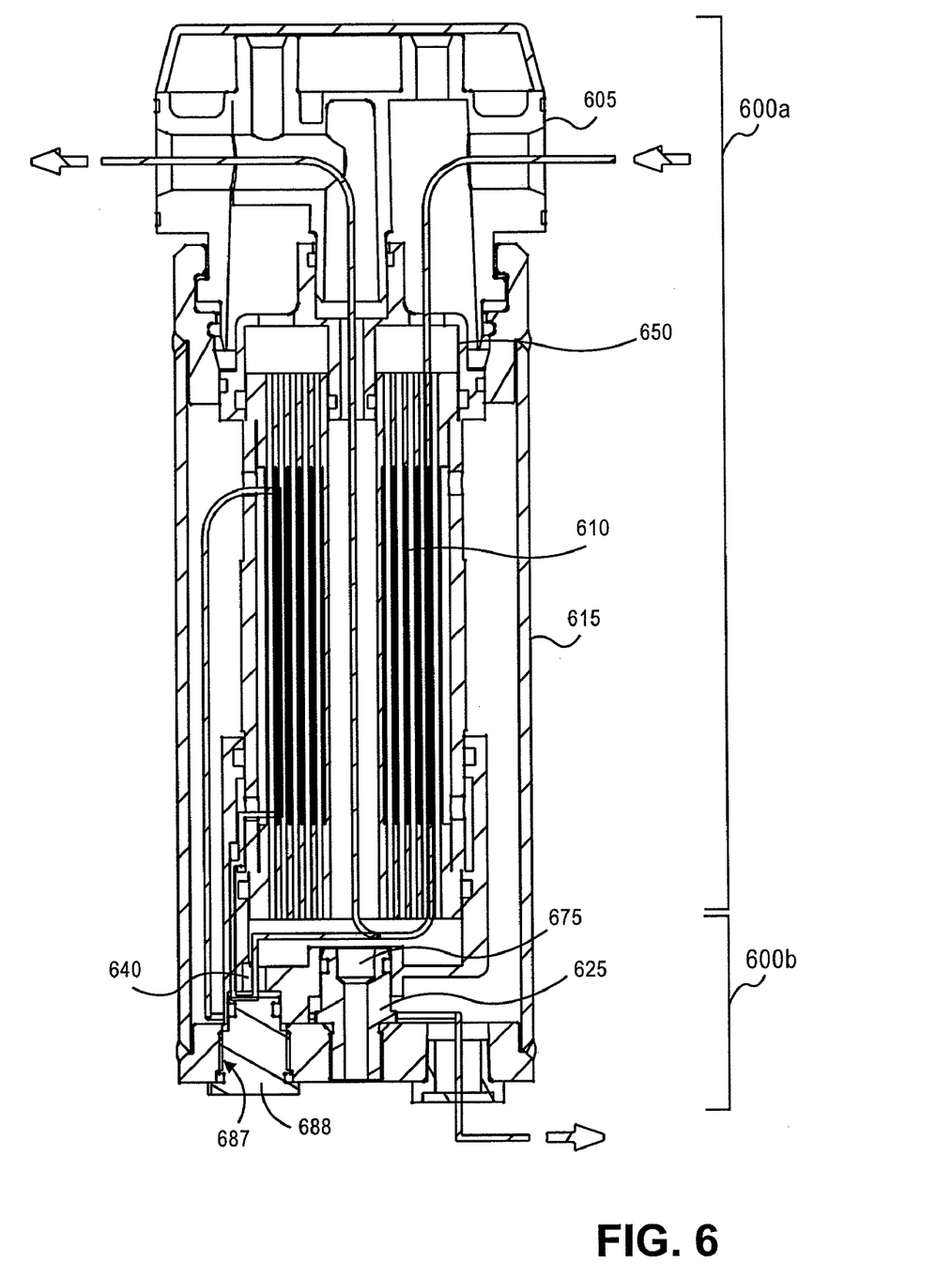
FIG. 6 provides a sectional view of a conventional dryer having a conventional sweep flow path.

In example embodiments of the present invention, the sweep controller components 100*b* may be retrofitted to existing membrane dryer vessels, such as conventional dryer 600*a* with conventional sweep flow components 600*b*, shown in FIG. 6. FIG. 6 provides a sectional view of a conventional dryer having a conventional sweep flow path. The same numbering scheme is utilized for the components of the conventional dryer as for the corresponding components within the present dryer 100*a* with integral sweep controller 100*b*. For instance, the conventional dryer 600*a* has a dryer bowl 615 and membrane head 605. The conventional dryer 600*a* with conventional sweep flow components 600*b* also includes additional components not present in the present dryer 100*a* with integral sweep controller 100*b*. For example, the conventional dryer 600*a* includes an offset hex sweep plug 688, which plugs off the offset hole 687 in the bottom of the bowl and provides the flow path for the sweep from the flow orifice 640 back into the bundle 610.

In the conventional flow path for conventional dryer 600*a* with conventional sweep flow components 600*b*, the center fitting 625 is plugged with a recessed hex plug 675 to prevent gas from flowing through the center fitting 625. In conventional dryer 600*a*, the membrane bundle 610 is purged by passing a portion of product dry gas over the exterior of the bundle of membrane fibers 610, just as dry gas sweeps the membrane bundle 110 of the present invention. Rather than regulating sweep using an integral sweep controller, conventional dryer 600*a* has conventional sweep components 600*b* which employ ordinary metering of sweep stream using a flow orifice 640 located in the bottom of the bundle 610. A major disadvantage of these conventional dryers is that there is no mechanism, other than the ordinary orifice 640, for controlling how much of the product dry air is diverted from the product gas stream for purging the membrane.

Existing membrane dryers such as dryer 600*a* having conventional sweep flow components 600*b* may be retrofitted generally by removing and plugging the hole of the flow orifice 640 and installing the sweep controller components containing flow orifice 140. First, before components of the sweep controller may be installed, the bowl 615 and bundle 610 should be removed from the membrane head 605. The offset hex sweep plug 688 should then be removed from bottom of the membrane bowl 615 and the bundle assembly 610 should be removed from the membrane bowl 615. In example embodiments of the retrofitting, the membrane bundle 610 may be loosened within the bowl 615 by inserting a small, round, blunt object (not shown) of approximately 0.5 inches, into the offset hole 687 and applying a steady force to the object until the bundle 610 moves in relation to the bowl 615. The loosened membrane bundle 610 may be carefully slid from the membrane bowl 615.

Figure 7A:
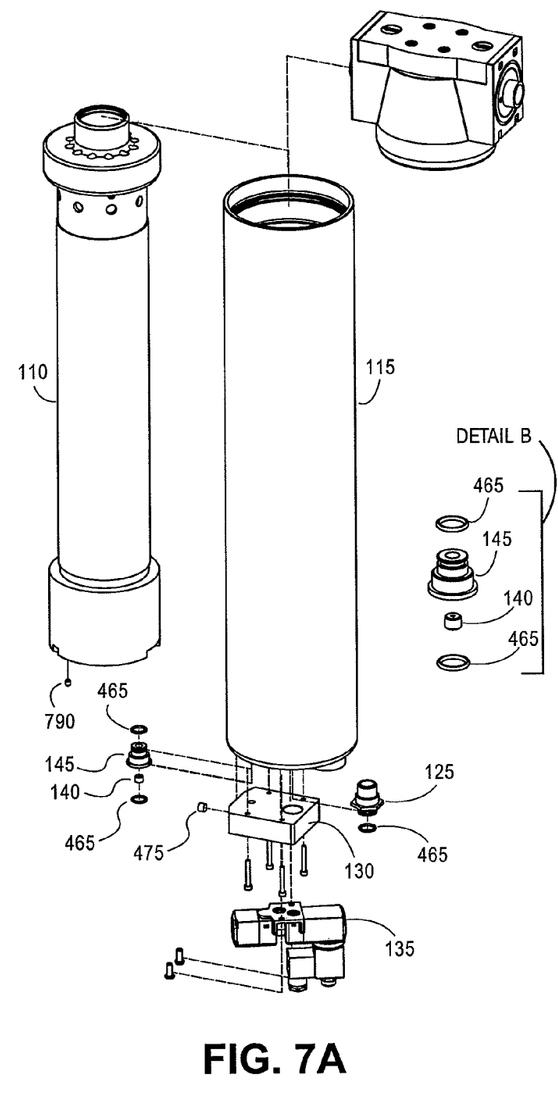
FIG. 7A provides an exploded view of the components of a dryer with integral sweep controller components in accordance an embodiment of the present invention and FIG. 7B provides a frontal view of a retrofitted membrane dryer in accordance with another embodiment of the present invention.

In example embodiments of retrofitting the sweep controller components 100*b* to existing membrane dryer 600*a*, once the membrane bundle has been removed, a center sweep control fitting 625 may be removed from the bottom of the dryer bowl 615. The recessed hex plug 675 in the center sweep control fitting 625 should be removed then the fitting 625 should be reinstalled and seated snuggly. The flow orifice 640 should be removed from the bundle and replaced with a recessed hex plug 790 to plug the hole that would remain for the sweep flow orifice 640 in existing models, as shown in FIG. 7A. The membrane bundle 610 may then be reinstalled by sliding the bundle 610 into the membrane bowl 615 until the center of the bundle bottom cap 655 is properly aligned with the sweep control fitting 625 at the bottom of the bowl. The bundle 610 should be turned until the offset hole 687 of the membrane bowl 615 and the offset port of the bundle bottom cap 655 are aligned. Then, a steady pressure should be applied on the bundle top cap 650 to seat the bundle 610 in the bowl 615.

In example embodiments of retrofitting the integral sweep controller components 100b to existing membrane dryers, once the membrane bundle 610 has been reinstalled, the sweep control fitting sub-assembly, as shown in Detail B of FIG. 7A, which includes the sweep control fitting 145, flow orifice 140 and seals 465, may be threaded into the membrane bowl 615 such that the fitting is flush with the bottom of the dryer membrane bowl 615. In this embodiment, the center fitting 625 for the sweep control feature does not receive a plug. The sweep control manifold 130 may be installed to the bottom of the bowl 615 after the installation of the sweep control manifold seal 465.

In example embodiments of retrofitting the integral sweep controller components 100b to conventional dryer 600a, the valve 135 may then be attached to the bottom of the sweep control manifold 130. In attaching the valve 135 to the bottom of the manifold 130, cross drilling within the manifold may be necessary to connect the inlet and outlet of the valve with the inlet and outlet of the manifold to enable sweep flow through the sweep control fitting subassembly. To close off the hole formed in the cross drilling process, a recessed hex plug 475 may be used, as shown in FIG. 7A.

Figure 7B:
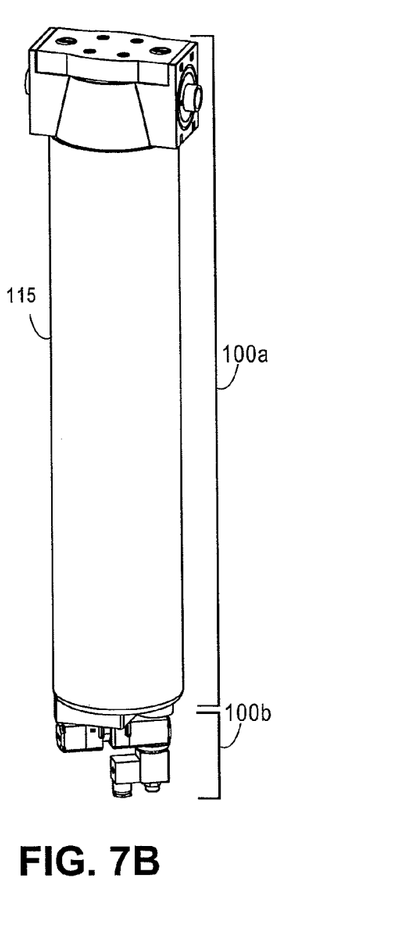

In example embodiments of retrofitting the sweep controller to existing membrane dryers, o-ring 465 may be installed in o-ring grooves on the base of the center sweep control fitting 125 prior to the installation of the fitting 125. In example embodiments, lubricant is applied to all o-rings/seals. Accordingly, the retrofitted conventional dryer 600a with conventional sweep components 600b is reassembled as shown in FIG. 7B. FIG. 7A provides an exploded view of the components of a dryer with integral sweep controller components in accordance an embodiment of the present invention and FIG. 7B provides a frontal view of a retrofitted membrane dryer in accordance with another embodiment of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A membrane separation device having an integral sweep controlling apparatus, comprising:
a membrane separation component, comprising:
a membrane having a permeate portion and a non-permeate portion;
a membrane housing which encases the membrane;
a feed gas inlet conduit connected to the membrane; and
a non-permeate product gas outlet conduit fluidly connected to the non-permeate portion of the membrane, wherein a major portion of a non-permeate gas is directed out of the membrane separation device through the non-permeate product gas outlet conduit; and
sweep controlling components coupled to the membrane separation component, comprising:
a sweep inlet conduit providing a gas connection from the sweep controlling components to the non-permeate portion of the membrane;
an electronically controlled valve controlled by an electronic signal from either an air service or a compressor based on air demand to vary with a duty cycle of an air compressor, the valve having multiple positions and connected to said sweep inlet conduit, wherein:
the multiple positions of the valve control passage of a minor portion of the non-permeate gas into an orifice, wherein the minor portion of the non-permeate gas is diverted from the major portion within the membrane housing; and,
said orifice controls a sweep stream that passes the minor portion of the non-permeate gas along the permeate portion of the membrane;
a sweep outlet conduit connected to the membrane housing, and carries the sweep stream out of the sweep controlling components; and
a sweep manifold attached to the membrane housing and attached to the sweep valve.

2. The membrane separation device, as claimed in claim 1, wherein the membrane includes a bundle of hollow fibers.

3. The membrane separation device, as claimed in claim 2, wherein the non-permeate portion of the membrane includes a center portion of the bundle of hollow fibers that the non-permeate gas flows through to reach the non-permeate product gas outlet.

4. The membrane separation device, as claimed in claim 1, wherein the sweep inlet conduit includes a sweep fitting within the membrane housing.

5. The membrane separation device, as claimed in claim 1, further comprising a transfer tube in a center portion of the membrane for transferring the major portion of the non-permeate product gas from the non-permeate portion of the membrane to the non-permeate product gas outlet conduit.

6. The membrane separation device, as claimed in claim 1, further comprising a membrane fitting connected at the non-permeate portion of the membrane for passing the minor portion of the non-permeate gas through the sweep manifold.

7. The membrane separation device, as claimed in claim 1, wherein the valve is an on-off valve.

8. The membrane separation device, as claimed in claim 7, wherein the on-off valve is a solenoid valve.

9. The membrane separation device, as claimed in claim 1, further comprising a top bundle cap for sealing the sweep stream within the membrane housing.

10. The membrane separation device, as claimed in claim 1, further comprising a bottom bundle cap for sealing the sweep stream within the membrane housing.

11. The membrane separation device, as claimed in claim 1, wherein the valve has an electronic control linked to an external device and cycles the valve open and closed with the operation of the external device.

12. The membrane separation device, as claimed in claim 11, wherein the electronic control is digital.

13. The membrane separation device, as claimed in claim 11, wherein the external device is an air compressor such that the electronic control enables the valve to vary with a duty cycle of the air compressor.

14. The membrane separation device, as claimed in claim 1, wherein the valve has voltage of 12 VAC to 480 VAC.

15. The membrane separation device, as claimed in claim 1, wherein the valve has voltage of 6 VDC to 125 VDC.

16. The membrane separation device, as claimed in claim 1, further comprising seals fitted between the sweep controlling components.

17. The membrane separation device, as claimed in claim 1, further comprising a recessed hex plug threaded into the sweep manifold.

18. The membrane separation device, as claimed in claim 1, further comprising a mounting bracket.

19. A membrane separation device having a sweep controlling apparatus, comprising:
a membrane separation means comprising:
separation means for separating permeate portions from non-permeate portions;
encasement means for encasing said separation means;
a feed inlet means for carrying a feed gas into the device; and,
a non-permeate product gas outlet means for carrying a major portion of a non-permeate product gas out of the device; and
sweep controller means comprising:
sweep inlet means for carrying a sweep gas into the sweep controller means, wherein the sweep gas includes a minor portion of the non-permeate gas which has been diverted from the major portion of the non-permeate gas within the encasement means;
orifice means for controlling passage of the sweep gas into the membrane separation means and along permeate portions of the separation means;
electronically controlled valve means controlled by an electronic signal from either an air service or a compressor based on air demand to vary with a duty cycle of an air compressor, the valve means for controlling passage of a sweep gas from the sweep inlet means into the orifice means, wherein the valve means has multiple positions;
sweep outlet means for carrying the sweep gas out of the sweep controlling apparatus wherein the sweep outlet means is connected to the encasement means; and
sweep manifold means for passing the sweep gas into the valve means.

20. The membrane separation device, as claimed in claim 19, wherein the valve means has an electronic control means that cycles the valve means open and closed in response to a duty cycle of an air compressor.

21. A method for retrofitting sweep controlling components to a membrane separation vessel, comprising:
removing a bundle of hollow fibers from a membrane separation bowl of the membrane separation vessel;
removing a recessed hex plug from a center fitting of the membrane separation vessel;
removing a flow orifice from the bundle of hollow fibers;
replacing the flow orifice with the recessed hex plug;
reinstalling the center fitting into the membrane separation vessel; reinstalling the bundle of hollow fibers into the membrane separation vessel;
placing the flow orifice into a sweep control fitting;
threading the sweep control fitting to the membrane separation vessel;
installing a sweep control manifold to the membrane separation vessel, wherein the sweep control manifold attaches and aligns to the center fitting; and
installing a valve to the sweep control manifold.

22. A method of using a membrane separation device having an integral sweep controlling apparatus, comprising:
separating a permeate gas from a non-permeate gas using a membrane separation component, comprising:
flowing a feed gas into a feed gas inlet conduit connected to the membrane separation component;
flowing the feed gas into a membrane having a permeate portion and a non-permeate portion, wherein the membrane is encased in a membrane housing;
flowing the non-permeate gas into a product outlet conduit fluidly connected to the non-permeate portion of the membrane, wherein a major portion of the non-permeate gas is directed out of the membrane separation device through the product outlet conduit;
flowing a minor portion of the non-permeate gas into sweep controlling components coupled to the membrane separation component, comprising:
flowing the minor portion of the non-permeate gas through a sweep manifold attached to the membrane housing;
flowing the minor portion of the non-permeate gas into an electronically controlled valve control controlled by an electronic signal from either an air service or a compressor based on air demand to vary with a duty cycle of an air compressor sweep inlet conduit providing a gas connection from the sweep controlling components to the non-permeate portion of the membrane; and
flowing the minor portion of the non-permeate gas into a valve having multiple positions and connected to the sweep inlet conduit and to the sweep manifold, wherein: the multiple positions of the valve control passage of the minor portion of the non-permeate gas into an orifice, wherein the minor portion of the non-permeate gas is diverted from the major portion within the membrane housing; and,
the orifice controls a sweep stream that passes the minor portion of the non-permeate gas along the permeate portion of the membrane; and
carrying the sweep stream out of the sweep controlling components using a sweep outlet conduit connected to the membrane housing.

* * * * *